United States Patent [19]

Ushirozawa

[11] Patent Number: 5,467,219

[45] Date of Patent: Nov. 14, 1995

[54] CONTROL DEVICE FOR AN OPTICAL AMPLIFIER

[75] Inventor: Mizuyuki Ushirozawa, Tokyo, Japan

[73] Assignee: NEC Corporation, Japan

[21] Appl. No.: 395,445

[22] Filed: Feb. 28, 1995

[51] Int. Cl.⁶ .............................. G02B 6/26; G02F 1/39; H04B 10/00; H01S 3/10

[52] U.S. Cl. ........................ 359/341; 359/174; 359/345; 372/70

[58] Field of Search ..................... 359/160, 174, 359/177, 341, 345; 372/70, 71; 385/1–3; 250/214 LA

[56] References Cited

U.S. PATENT DOCUMENTS

| | | | |
|---|---|---|---|
| 5,054,876 | 10/1991 | Grasso et al. | 385/24 |
| 5,226,051 | 7/1993 | Chan et al. | 372/70 |
| 5,268,786 | 12/1993 | Matsushita et al. | 359/341 |
| 5,278,686 | 1/1994 | Grasso et al. | 359/110 |
| 5,299,055 | 3/1994 | Yoneyam | 359/341 |
| 5,343,320 | 8/1994 | Anderson | 359/160 |
| 5,355,250 | 10/1994 | Grasso et al. | 359/341 |
| 5,374,973 | 12/1994 | Maxham et al. | 359/341 |

FOREIGN PATENT DOCUMENTS

| | | |
|---|---|---|
| 58-86786 | 5/1983 | Japan . |
| 60-72429 | 4/1985 | Japan . |
| 62-158408 | 10/1987 | Japan . |
| 63-64142 | 4/1988 | Japan . |

OTHER PUBLICATIONS

Okamara et al, IEEE Journ. of Solid–State Circuits; vol. 27, No. 12, Dec. 1992, pp. 1775–1780, Abstract Only Renewed & Copy of Abstract Herewith.

*Primary Examiner*—Nelson Moskowitz
*Attorney, Agent, or Firm*—Ostrolenk, Faber, Gerb & Soffen

[57] ABSTRACT

A control circuit for reducing the output of an optical amplifier when reflected light associated with the output of the amplifier temporarily increases. An erbium-added optical fiber amplifies an input optical signal. Two optical detectors respectively detect the amplified optical signal and the reflected light. When a reflected light monitor signal does not exceed the level of a threshold signal, an output control circuit controls the intensity of an exciting light source in accordance with the an output light monitor signal. However, when the former exceeds the latter, the output control circuit reduces the output power of the optical signal. At this instant, the threshold level is lowered. As soon as the reflected light monitor signal becomes lower than the lowered threshold, an inverting amplifier causes the monitor signal to be restored to the original level.

4 Claims, 6 Drawing Sheets

CONTROL DEVICE FOR AN OPTICAL AMPLIFIER

BACKGROUND OF THE INVENTION

The present invention relates to a control device for an optical amplifier included in an optical communication system and, more particularly, to an optical amplifier control device capable of reducing the output power of the amplifier in a predetermined situation, e.g., when an output connector comes off.

In an optical communication system, an optical transmitter emits a high-output optical signal. This kind of optical signal is harmful to the eye of a person performing maintenance or inspection. A control device for an optical amplifier is conventional which detects the come-off of an output connector included in the amplifier or similar accident in response to the resulting increase in the reflection of the optical signal and automatically reduces the output power of the amplifier. When, for example, the output connector is fixed again, the control circuit automatically restores the output power on detecting the resulting decrease in reflection. General optical output control for an optical communication apparatus is taught in Japanese Utility Model Laid-Open Publication No. 63-64142. Implementations relating to optical transmission are also disclosed in Japanese Patent Laid-Open Publication Nos. 58-86786 and 60-72429 and Japanese Utility Model Laid-Open Publication No. 62-158408 by way of example.

Assume that an optical amplifier outputs power Po, and that light reflected from the end face of an output connector and a transmission path to which the connector is connected has power Pr. It has been customary with a control device of the type controlling the output of an optical amplifier to monitor a ratio Pr/Po, reduces the output power when the ratio Pr/Po exceeds a preselected threshold, and restores the output power when it decreases to below the threshold. However, the problem with the conventional control device is that it is complicated and bulky since it needs relatively large scale circuitry.

SUMMARY OF THE INVENTION

It is, therefore, an object of the present invention to provide an optical amplifier control device having a simple and miniature configuration.

It is another object of the present invention to provide an optical amplifier control device having a simple and miniature configuration and, in addition, capable of stabilizing output power.

In accordance with the present invention, a control device for an optical amplifier has an optical fiber to which a rare-earth element is added as a medium for amplifying an optical signal, an exciting light source for exciting the optical fiber, a driver for driving the exciting light source, an output power detector for detecting the output power of the optical fiber, a reflected light power detector for detecting reflected light power associated with the output of the optical fiber, a comparator for comparing the reflected light power with a predetermined threshold, an output control circuit for receiving the output power and the result of comparison output from the comparator, and for controlling the driver such that when the reflected light power does not exceed the threshold, the output power remains at a predetermined value while, when the reflected light power exceeds the threshold, the output power decreases, and a threshold changing circuit for lowering, when the reflected light power exceeds the threshold, the threshold to a predetermined level or restoring, when the reflected light power increases to above the lowered threshold, the threshold to an original level.

Also, in accordance with the present invention, a control device for an optical amplifier has an optical fiber to which a rare-earth element is added as a medium for amplifying an optical signal, an exciting light source for exciting the optical fiber, a driver for driving the exciting light source, an output power detector for detecting the output power of the optical fiber, a reflected light power detector for detecting reflected light power associated with the output of the optical fiber, a comparator for comparing the reflected light power with a predetermined threshold, a delay circuit for delaying the result of comparison output from the comparator, an output control circuit for receiving the output power and the delayed result of comparison output from the delay circuit, and for controlling the driver such that when the reflected light power does not exceed the threshold, the output power remains at a predetermined value while, when the reflected light power exceeds the threshold, the output power decreases, and a threshold changing circuit for lowering, when the reflected light power exceeds the threshold as determined on the basis of the delayed result of comparison, the threshold to a predetermined level or restoring, when the reflected light power increases to above the lowered threshold, the threshold to an original level.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENT

Figure 1:
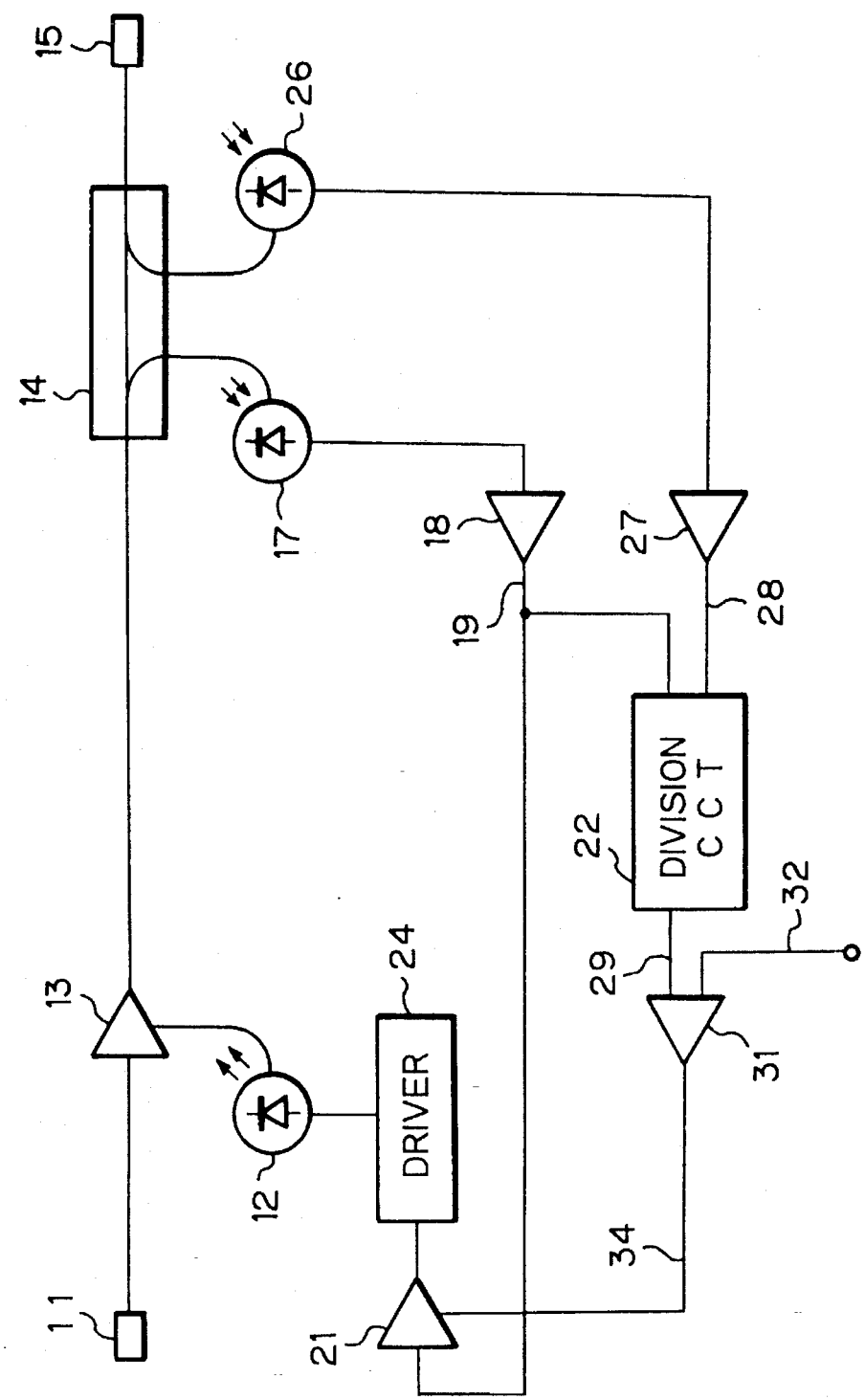
FIG. 1 is a block diagram schematically showing a conventional control device for an optical amplifier.

To better understand the present invention, a brief reference will be made to a conventional optical amplifier control device, shown in FIG. 1. As shown, an optical signal coming in through an input connector 11 is incident to an erbium-added optical fiber 13. The optical fiber 13, constantly excited by an exciting light source 12, amplifies the input optical signal. The amplified signal is input to an optical splitter 14 and split into two thereby. Specifically, one of two paths extends from the optical splitter 14 to a transmission path, not shown, via an output connector 15 while the other path extends from the splitter 14 to an optical detector 17.

On detecting the signal, the optical detector 17 sends a detection signal to an amplifier 18. The amplifier 18 transforms the detector output to an electric signal, or output light monitor signal, 19 which is proportional to the power of the output optical signal. The monitor signal 19 is applied to an output control circuit 21 and to one input terminal of a division circuit 22. In response to the output of the control circuit 21, a driver 24 controls the light source 12 such that the optical signal from the output connector 15 has predetermined power.

The optical signal output from the output connector 15 is partly reflected by the end face of the connector 15 and the transmission path and returned toward the amplifier side. This part of the optical signal is detected by an optical detector 26 and then amplified by an amplifier 27 to turn out a reflected light monitor signal 28. The monitor signal 28 is an electric signal proportional to the reflected light. The monitor signal 28 is applied to the other input terminal of the division circuit 22. Assume that the output light monitor signal 19 and the reflected light monitor signal 28 have signal levels Po and Pr, respectively. The division circuit 22 produces a division signal 29 proportional to the ratio of the level Pr of the signal 28 to the level Po of the signal 19.

The division signal 29 and a threshold signal 32 are respectively applied to two input terminals of a comparator 31 and compared thereby. When the quantity of the reflected light exceeds a preselected threshold due to, for example, the come-off of an optical connector, the comparator 31 sends a power down command signal 34 to the output control circuit 21. As a result, the output power of the amplifier 18, applied to the driver 24, is lowered to lower the output power of the optical signal issuing from the output connector 15.

The optical connector come off is fixed again under the power down condition stated above. Then, as the level of the division signal 29 falls below the level of the threshold signal 32, the comparator 31 stops generating the power down command signal 34. As a result, the optical signal from the output connector 15 is restored to the predetermined value.

Figure 2:
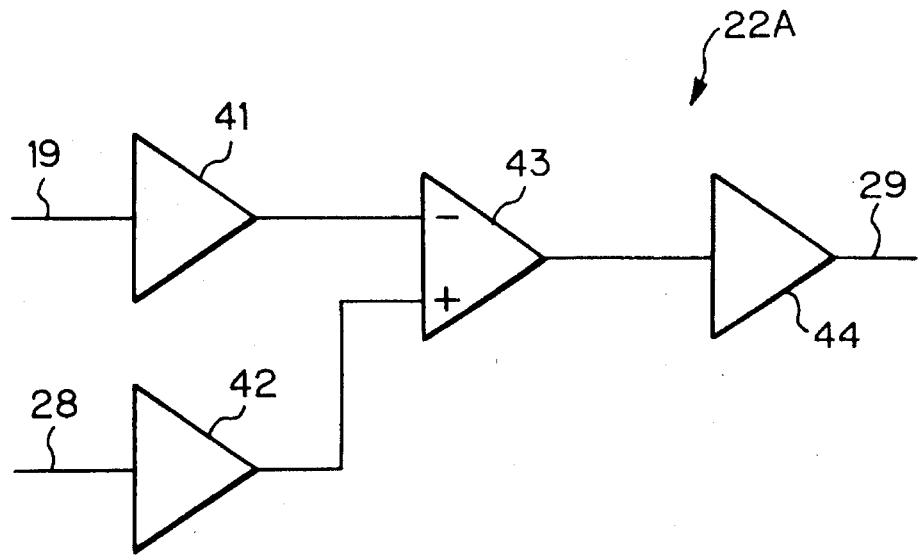
FIGS. 2 and 3 are block diagrams each schematically showing a specific configuration of a division circuit included in the conventional control device.
Figure 3:
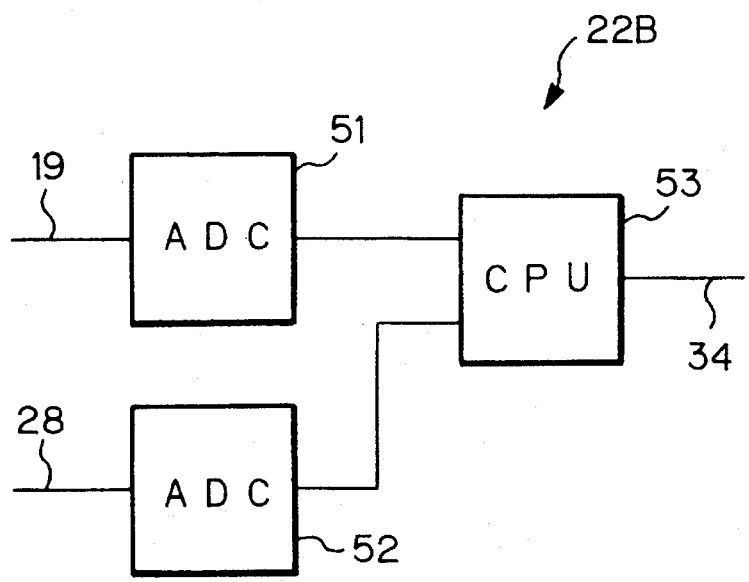

FIGS. 2 and 3 each shows a specific configuration of the division circuit included in the conventional control device. FIG. 2 shows a division circuit 22A in which the output light monitor signal 19 and the reflected light monitor signal 28 are respectively input to a first and a second logarithmic converter 41 and 42. A differential amplifier 43 produces a difference between the outputs of the logarithmic converters 41 and 52. A reverse logarithmic converter 44 executes reverse conversion with the output of the differential amplifier 43, thereby producing the division signal 29. On the other hand, FIG. 3 shows a division circuit 22B having a first and a second analog-to-digital converter (ADC) 51 and 52. The output light monitor signal 19 and the reflected light monitor signal 28 are input to the ADCs 51 and 52, respectively. The digital signal from the ADCs 51 and 52 are input to a CPU (Central Processing Unit) 53. In response, the CPU 53 produces the division signal, compares it with a digital signal corresponding to the threshold signal 32, FIG. 1, and thereby outputs the power down signal 34.

As stated above, the conventional control device uses one of the division circuits 22A and 22B shown in FIGS. 2 and 3, respectively. This kind of scheme, however, needs relatively large scale circuitry including the logarithmic converters 41 and 42 or the ADCs 51 and 52 and CPU 53. It follows that the entire control device is complicated and bulky.

Figure 4:
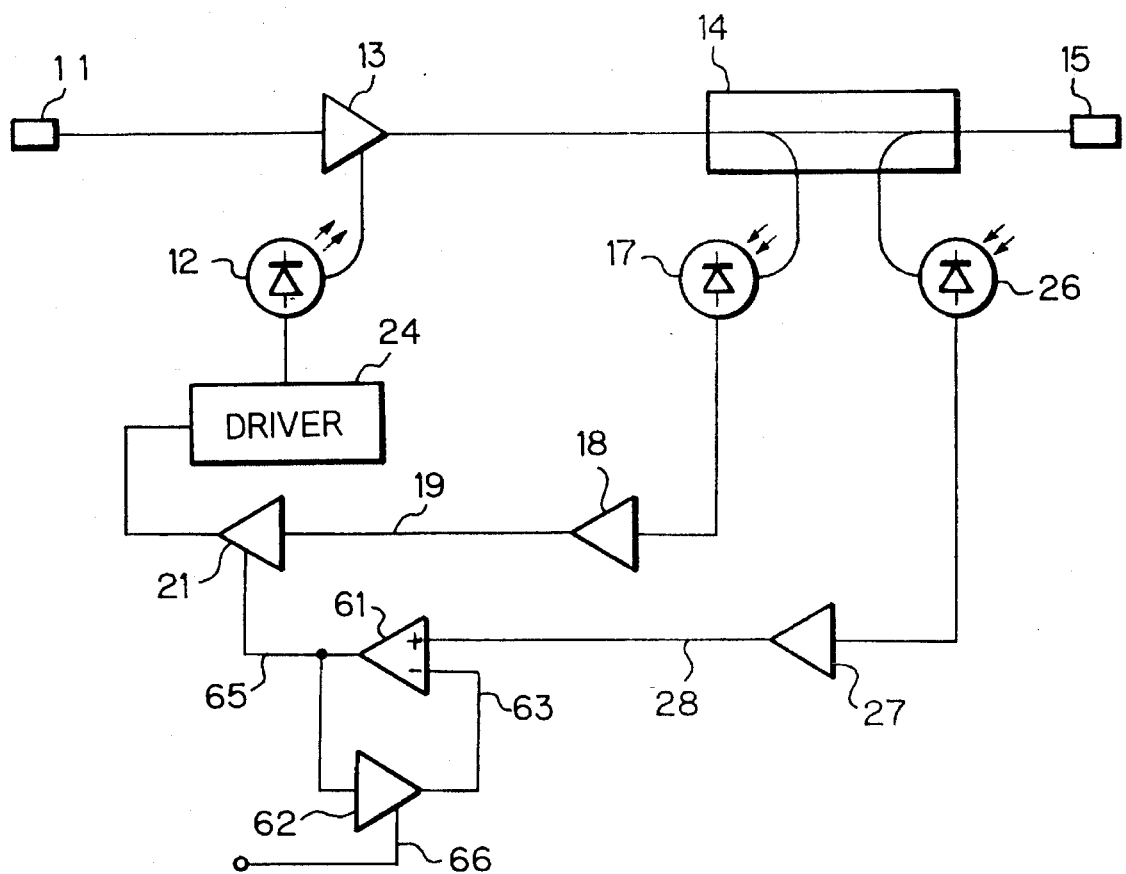
FIG. 4 is a block diagram schematically showing an optical amplifier control device embodying the present invention.

Referring to FIG. 4, an optical amplifier control device embodying the present invention is shown. In FIG. 4, the same or similar constituent parts as or to the parts shown in FIG. 1 are designated by the same reference numerals. As shown, an optical signal coming in through an input connector 11 is incident to an erbium-added optical fiber 13. The optical fiber 13, constantly excited by an exciting light source 12, amplifies the input optical signal. The amplified signal is input to an optical splitter 14 and split into two. Specifically, one of two paths extends from the optical splitter 14 to a transmission path, not shown, via an output connector 15 while the other path extends from the splitter 14 to an optical detector 17. On detecting the signal, the optical detector 17 sends a detection signal to an amplifier 18. The amplifier 18 transforms the detector output to an electric signal, or output light monitor signal, 19 which is proportional to the power of the output optical signal. The arrangement described so far is identical with the arrangement of the conventional control device. In the illustrative embodiment, the output light monitor signal 19 is fed to an output control circuit 21. The control circuit 21 controls a driver 24 such that the light source 12, being excited by the driver 24, provides the optical signal to be output from the output connector 15 with predetermined power.

The optical signal going out from the output connector 15 is partly reflected by the end face of the connector 15 and the transmission path. The reflected signal is amplified by an amplifier 27 to turn out an electric signal, or reflected light monitor signal, 28 which is proportional to the reflected light. The monitor signal 28 is applied to one input terminal of a comparator 61. A threshold signal 63 representing a predetermined threshold is fed from an inverting amplifier 62. The inverting amplifier 62 receives the output signal 65 of the comparator 61 and has a DC offset 66 thereof adjusted. At the same time, the signal 65 from the comparator 61 is fed to the output control circuit 21. With this configuration, the control circuit determines the power of the optical signal to be output from the output connector 15 and the threshold assigned to the comparator 61.

A specific operation of the embodiment will be described with reference to FIG. 5. As shown, assume that the reflected light monitor signal 28 sharply increases from a normal level at a time $t_1$. Before the time $t_1$, i.e., in the normal condition, the monitor signal 28 is lower in level than the threshold signal 63. As a result, the output signal 65 of the comparator 61 goes low at the time $t_1$, commanding the output control circuit 21 to lower the power. At the same time, the low level signal 65 is fed to the inverting amplifier 62. As a result, the level of the threshold signal 63 is lowered at the time $t_1$. In response to the signal 65, the output control circuit 21 reduces the exciting light output of the light source 12 and, therefore, the output of the optical fiber, or optical amplifier, 13 such that the power of the driver 24 decreases.

Figure 5:
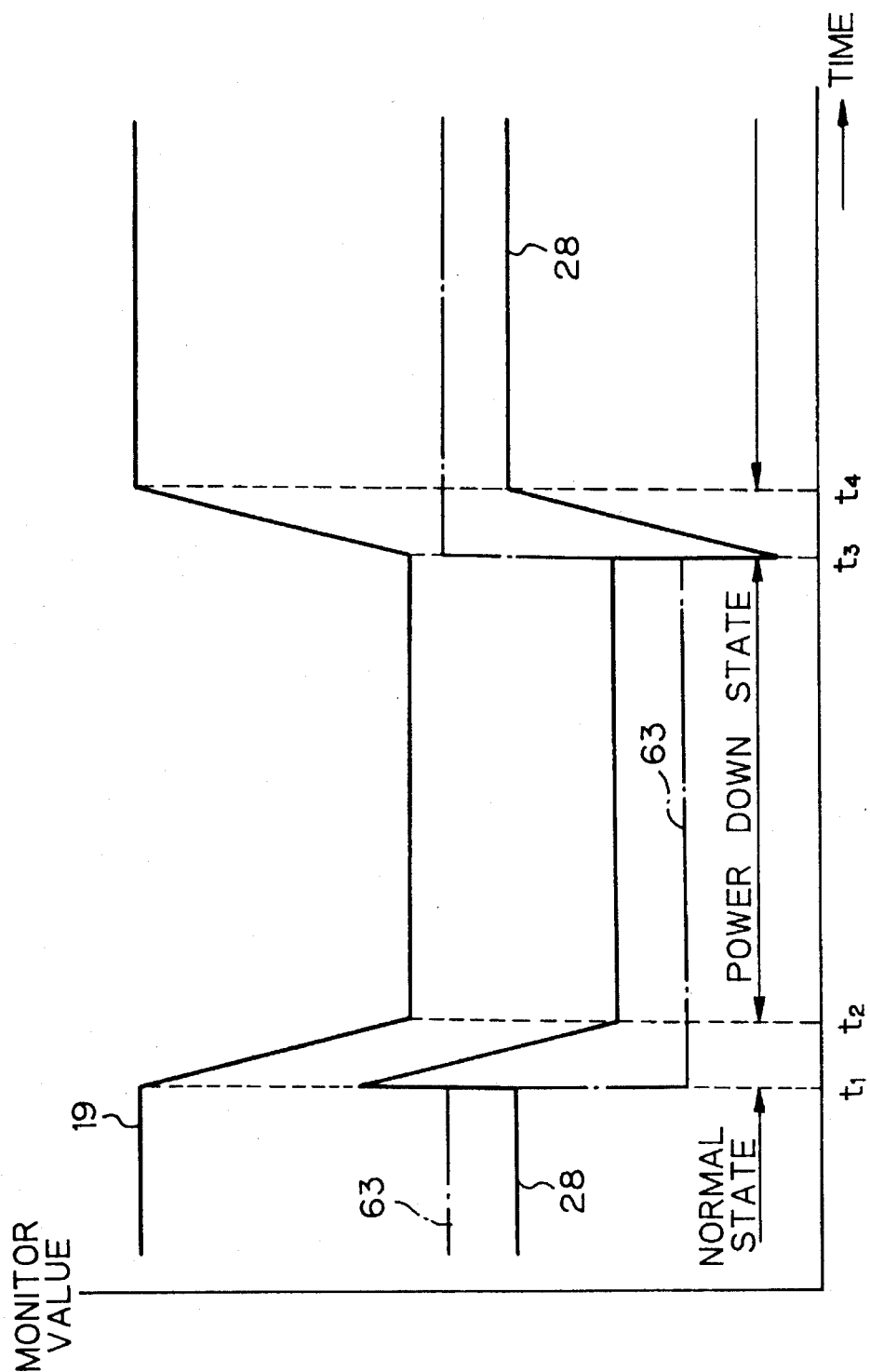
FIG. 5 shows various waveforms demonstrating a specific operation of the embodiment.

As FIG. 5 indicates, the threshold signal 63 input to the comparator 61 is lowered before the level of the output light monitor signal 19 which represents the output of the optical amplifier. This allows the power to be lowered stably. At a time $t_2$, the monitor signal 19 reaches a low level and remains at such a low level thereafter. Also, the reflected light monitor level 28 remains constant at a low level which is lower than the level of the monitor signal 19. Assume that the reflection decreases at a time $t_3$ due to, for example, the fixation of the faulty optical connector. At this time, the level of the reflected light monitor signal 28 becomes lower than the level of the threshold signal 63. As a result, the output signal 65 of the comparator 61 goes high, commanding the output control circuit 21 to cancel the power down condition. At the same time, the signal 65 causes the inverting amplifier 62 to raise the level of the threshold signal 63. Again, the threshold signal 63 rises before the output light monitor signal 19, so that the optical amplifier can restore the power stably.

Figure 6:
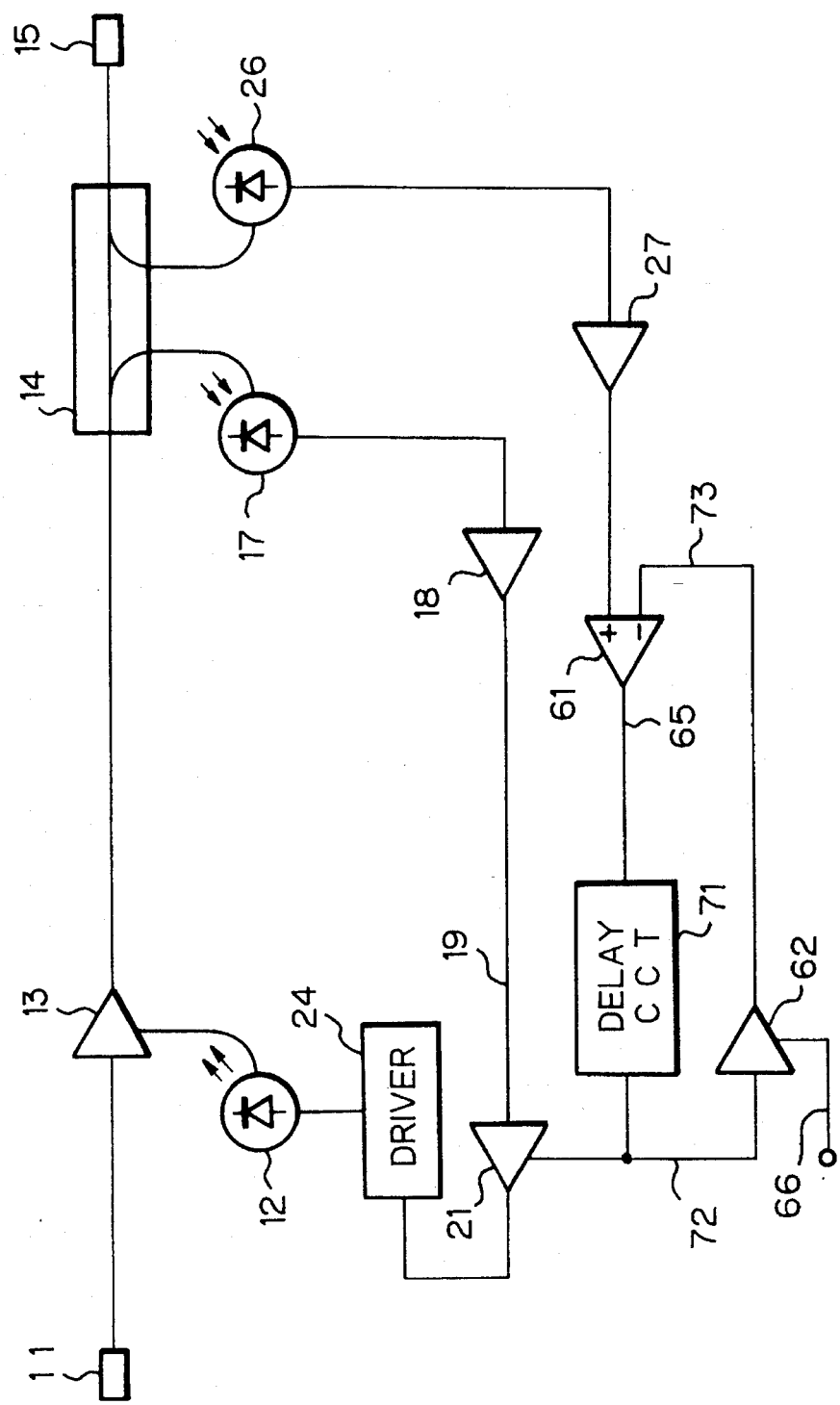
FIG. 6 is a schematic block diagram showing a modification of the embodiment.

A modified form of the control device shown in FIG. 4 will be described with reference to FIG. 6. In FIG. 6, the same or similar constituent parts as or to the parts shown in FIG. 4 are designated by the same reference numerals, and a detailed description thereof will not be made in order to avoid redundancy. As shown, the output signal 65 of the comparator 61 is applied to a delay circuit 71. As a result, a delayed power down control signal 72 is fed from the delay circuit 71 to both the output control circuit 21 and the inverting amplifier 62. In response, the inverting amplifier 62 produces a threshold signal 73 which, like the threshold signal 63, is delivered to the other input terminal of the comparator 61. Assume that the delay circuit 71 has a delay time τ, and that a decrease in reflection is detected and dealt with by the reconnection of the faulty output connector. In this condition, although a temporary decrease in reflection whose duration is shorter than the delay time τ may repeatedly occur, the delay circuit 71 delays the control over the power of the light source 12 by the delay time τ.

Figure 7:
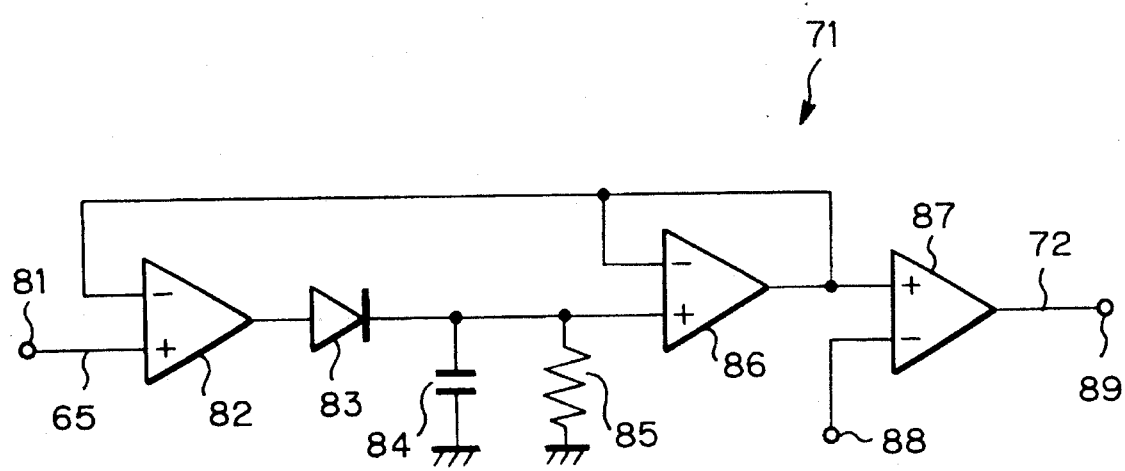
FIG. 7 is a circuit diagram representing a specific configuration of a delay circuit included in the modification.

FIG. 7 shows a specific construction of the delay circuit 71. As shown, a first operational amplifier (OP AMP) 82 has a non-inverting input terminal connected to an input terminal 81 and has an output terminal connected to the cathode of a diode 83. The anode of the diode 83 is connected to one end of a capacitor 84 the other end of which is connected to ground, one end of a resistor 85 the other end of which is also connected to ground, and the non-inverting input terminal of a second OP AMP 86. The output terminal of the second OP AMP 86 is connected to one input terminal of a comparator 87 and the inverting input terminals of the OP AMPs 82 and 86. A preselected reference voltage 88 is applied to the other input terminal of the comparator 87. The delayed power down control signal 72, appearing on the output terminal 89 of the comparator 87, has been delayed by the delay time τ determined by the capacitor 84 and resistor 85.

Figure 8:
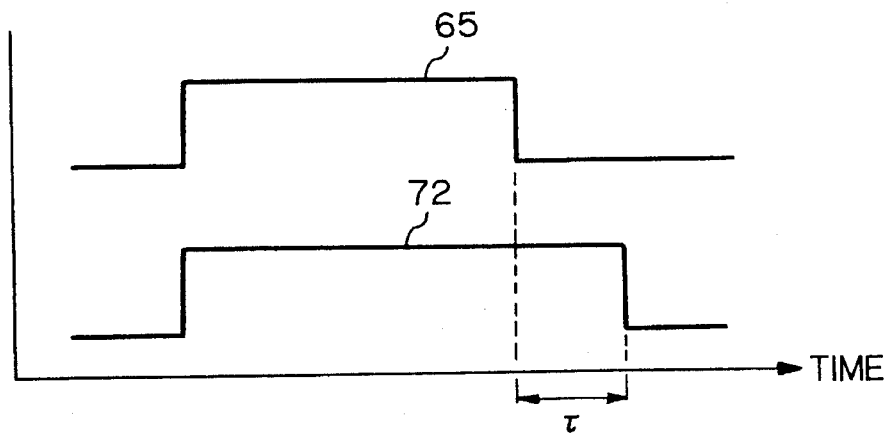
FIG. 8 is a timing chart indicating a relation between signals appearing on an input terminal and an output terminal included in the modification.

FIG. 8 indicates a relation between the signals 65 and 72 to appear on the input terminal 81 and output terminal 89 of the delay circuit 71 with respect to time. As shown, the power down control signal 72 goes low a period of time τ later than the output signal 65. Hence, the control signal does not restore the output of the light source 12 until a decrease in reflection lasting longer than the delay time τ has been detected. This enhances the reliable operation of the circuitry.

In summary, it will be seen that the present invention provides an optical amplifier control device which, with extremely simple circuitry having a comparator and an inverting amplifier in place of a conventional division circuit, can lower an output in response to an increase in reflected light caused by, for example, the come-off of a connector included in an optical amplifier. Also, the control device is capable of restoring the original output level stably as soon as the reflected light again decreases.

Further, a delay circuit delays the result of comparison by a predetermined period of time. Hence, even when a temporary decrease or increase in reflected light repeatedly occurs during, for example, the fixation of an output connector, exciting light is prevented from rising to the original level until the reconnection completes, i.e., until the reflected light fully decreases. This eliminates instantaneous changes in output.

Various modifications will become possible for those skilled in the art after receiving the teachings of the present disclosure without departing from the scope thereof. For example, the control circuit may be constructed such that the reflected light monitor signal 28, FIG. 4, falls in level when the reflected light increases in quantity. This modification is practicable if the inverting amplifier 62, FIG. 4, is replaced with an in-phase amplifier.

What is claimed is:

1. A control device for an optical amplifier, comprising:
   an optical fiber to which a rare-earth element is added as a medium for amplifying an optical signal;
   an exciting light source for exciting said optical fiber;
   driving means for driving said exciting light source;
   output power detecting means for detecting output power of said optical fiber;
   reflected light power detecting means for detecting reflected light power associated with an output of said optical fiber;
   comparing means for comparing said reflected light power with a predetermined threshold;
   output control means for receiving said output power and a result of comparison output from said comparing means, and for controlling said driving means such that when said reflected light power does not exceed said threshold, said output power remains at a predetermined value while, when said reflected light power exceeds said threshold, said output power decreases; and
   threshold changing means for lowering, when said reflected light power exceeds said threshold, said threshold to a predetermined level or restoring, when said reflected light power increases to above the lowered threshold, said threshold to an original level.

2. A control device as claimed in claim 1, wherein said rare-earth element comprises erbium.

3. A control device for an optical amplifier, comprising:
   an optical fiber to which a rare-earth element is added as a medium for amplifying an optical signal;
   an exciting light source for exciting said optical fiber;
   driving means for driving said exciting light source;
   output power detecting means for detecting output power of said optical fiber;
   reflected light power detecting means for detecting reflected light power associated with an output of said optical fiber;
   comparing means for comparing said reflected light power with a predetermined threshold;
   delaying means for delaying a result of comparison output from said comparing means;
   output control means for receiving said output power and a delayed result of comparison output from said delaying means, and for controlling said driving means such that when said reflected light power does not exceed said threshold, said output power remains at a predetermined value while, when said reflected light power exceeds said threshold, said output power decreases; and
   threshold changing means for lowering, when said reflected light power exceeds said threshold as determined on the basis of said delayed result of comparison, said threshold to a predetermined level or restoring, when said reflected light power increases to above the lowered threshold, said threshold to an original level.

4. A control device as claimed in claim 3, wherein said rare-earth element comprises erbium.

\* \* \* \* \*